US008531275B2

(12) United States Patent
Iten et al.

(10) Patent No.: US 8,531,275 B2

(45) Date of Patent: Sep. 10, 2013

(54) REMOTE CONTROL MODE ON-SCREEN DISPLAYS AND METHODS FOR PRODUCING THE SAME

(75) Inventors: Tommi Iten, Redondo Beach, CA (US); Eric Bennett, Los Angeles, CA (US); David Green, Castaic, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1955 days.

(21) Appl. No.: 11/346,499

(22) Filed: Feb. 2, 2006

(65) Prior Publication Data

US 2007/0176787 A1 Aug. 2, 2007

(51) Int. Cl.
*G08C 19/16* (2006.01)
*G08C 19/12* (2006.01)
*G05B 11/01* (2006.01)

(52) U.S. Cl.
USPC .................... 340/12.22; 340/12.5; 340/12.54; 340/13.24

(58) Field of Classification Search
USPC .... 340/825.69, 825.22, 825.79, 12.22–12.26, 340/13.24; 348/13, 734; 341/176, 173; 708/145
See application file for complete search history.

(56) References Cited

U.S. PATENT DOCUMENTS

| | | | | |
|---|---|---|---|---|
| 4,626,848 | A | | 12/1986 | Ehlers |
| 4,825,200 | A | | 4/1989 | Evans et al. |
| 4,914,517 | A | | 4/1990 | Duffield |
| 5,068,734 | A | | 11/1991 | Beery |
| 5,455,570 | A | | 10/1995 | Cook et al. |
| 5,523,800 | A | | 6/1996 | Dudek |
| 5,589,878 | A | | 12/1996 | Cortjens et al. |
| 5,592,213 | A | * | 1/1997 | Yoshinobu et al. ........... 725/131 |
| 5,614,906 | A | | 3/1997 | Hayes et al. |
| 5,883,680 | A | * | 3/1999 | Nykerk ......................... 348/734 |
| 5,986,650 | A | | 11/1999 | Ellis et al. |
| 6,008,735 | A | * | 12/1999 | Chiloyan et al. ......... 340/825.22 |
| 6,215,531 | B1 | | 4/2001 | Beery |
| 6,331,877 | B1 | | 12/2001 | Bennington et al. |
| 6,344,817 | B1 | * | 2/2002 | Verzulli ........................ 341/176 |
| 6,628,344 | B1 | | 9/2003 | Weber |
| 6,668,133 | B2 | * | 12/2003 | Yuen et al. ...................... 386/83 |
| 6,795,011 | B1 | * | 9/2004 | Berthoud et al. ............. 341/173 |
| 7,068,322 | B2 | * | 6/2006 | Tsubouchi .................... 348/485 |
| 2003/0095212 | A1 | | 5/2003 | Ishihara |
| 2004/0046677 | A1 | | 3/2004 | Dresti et al. |
| 2004/0169590 | A1 | | 9/2004 | Haughawout et al. |

FOREIGN PATENT DOCUMENTS

| | | |
|---|---|---|
| JP | 06125480 A | 6/1994 |

* cited by examiner

*Primary Examiner* — Nam V Nguyen

(57) ABSTRACT

Methods and apparatus are disclosed for notifying a user of a remote control regarding the mode of a remote control. An example method includes detecting a code from the remote control, comparing the detected code to a list of recognized codes, and informing the user of the mode the remote control is operating based on the detected code and/or that the current mode of the remote control is not programmed.

23 Claims, 8 Drawing Sheets

REMOTE CONTROL MODE ON-SCREEN DISPLAYS AND METHODS FOR PRODUCING THE SAME

FIELD OF THE DISCLOSURE

This disclosure relates generally to remote controls and, more particularly, to remote control mode on-screen displays (OSDs) and methods of producing the same.

BACKGROUND

Many consumer products are designed to be operated remotely, usually by an infrared (IR) or radio frequency (RF) remote control. Many of these products, for example, satellite receivers, televisions, video cassette recorders (VCRs) and digital versatile disc (DVD) players interact with one another but all usually require separate remote controls. Typically, two or more of these products are operated simultaneously, which may create confusion as to which remote control to use for which product. Also, it is cumbersome to maintain multiple remote controls.

To alleviate these problems, universal remote controls have been developed recently. A single universal remote control replaces two or more manufacturers' original remote controls. Universal remote controls have various modes and are programmed according to the various products the remote control is used to operate. Universal remote controls typically include keys or buttons that correspond to the various modes of the remote control. Pressing an appropriate button places the remote control in a mode for communicating with one of the associated products or equipment. Commands are then sent from the universal remote control in the form of IR or RF codes that identify the equipment and/or command sent to the desired equipment.

Often a user forgets to what mode the universal remote control has been set or the modes that have been programmed into the remote control. In such cases, a user may inadvertently switch the mode of the remote control to a mode that the intended device does not recognize or to a mode on the remote control that is not otherwise programmed. When a remote control has been switched to an unprogrammed mode, the user may press a button on the remote control, expecting to control either a television, a satellite receiver, or other piece of equipment, and nothing will happen. The non-responsiveness of the equipment to the user's actuation of a button on the remote control results in user frustration and/or confusion. This frustration and confusion further increases the number of service calls logged to satellite or cable signal providers by users attempting to troubleshoot this problem or claiming to have defective equipment.

DETAILED DESCRIPTION

Figure 1:
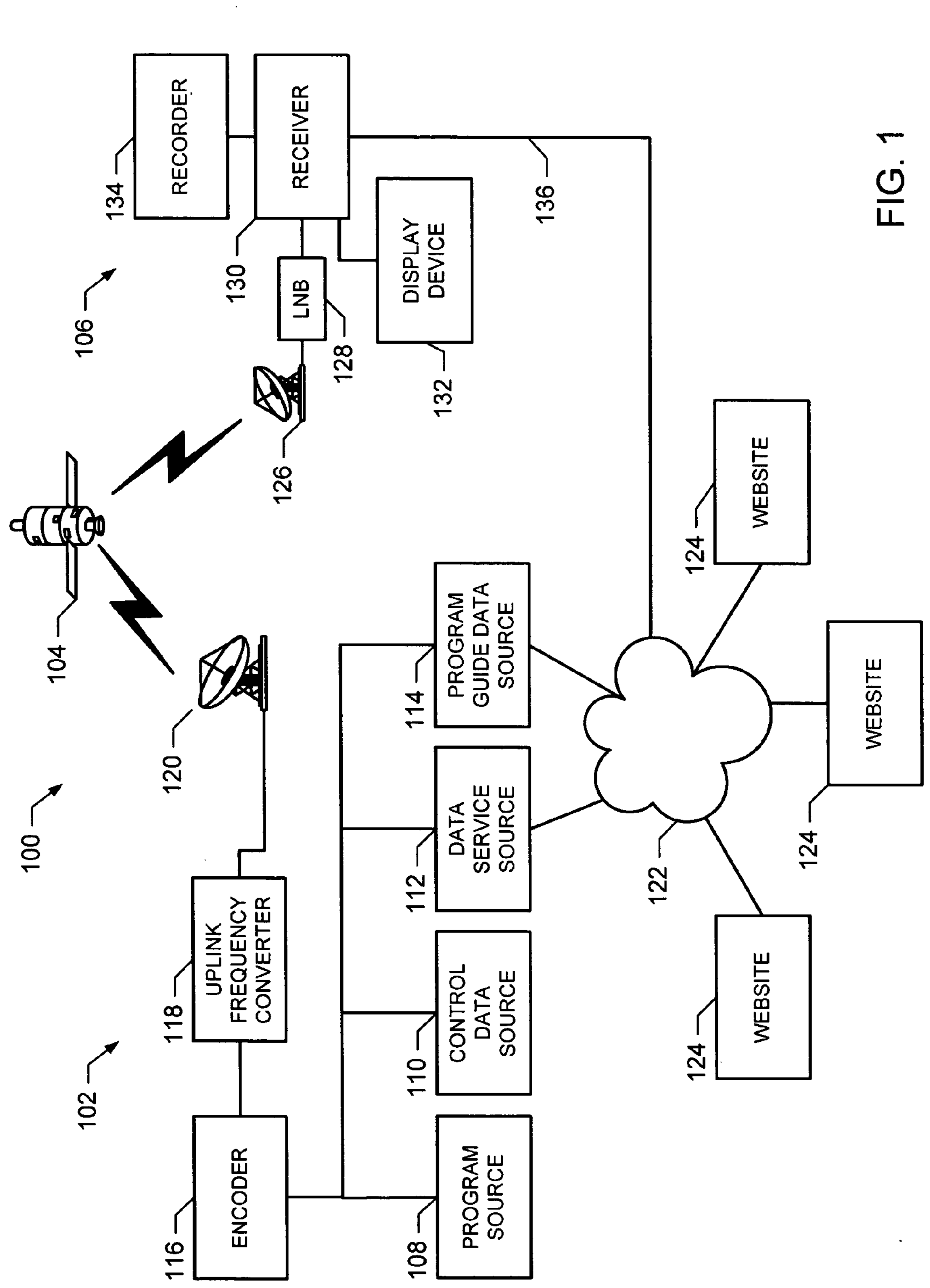
FIG. 1 is a schematic illustration of an example satellite broadcast system.

Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

The example methods, apparatus and articles of manufacture described herein may be used to enable a user of a universal remote control to configure the remote control to one or more of satellite receivers, televisions, VCRs, DVD players or other devices, if desired. Unlike traditional universal remote controls and the systems upon which they operate, the example methods, apparatus and articles of manufacture have been described herein create an on-screen display (OSD) to notify the user of the operating mode of a remote control or that the mode of the remote control is unprogrammed. This method supplements, and does not necessarily replace, existing methods, such as indicator lights or switch labels on the remote control. Thus, when the user is attempting to use a remote control in a mode that has not been programmed or switches to a mode of the remote control that is programmed, the user is able to visually see, through the OSDs why the remote control or equipment is seemingly non-responsive or otherwise not operating in an intended manner (if the mode of the remote control is unprogrammed) or which mode the remote control is in (if the mode is programmed).

According to an example method, as described herein, a remote control emits several types of codes. The remote control may emit a code for a device that is programmed to operate that device. The remote may also emit a code that is recognized by the set-top box, which indicates that the mode of the remote control is not programmed. And the remote control may emit a code that is recognized by the set-top box that indicates that the mode of the remote control is programmed and what that mode is. One or more of these codes may be emitted by the remote control simultaneously or sequentially. For example, if the remote control is in a mode for a device that has been programmed and the user operates the remote control, the remote control will emit a code to operate the device as well as a code that is recognized by the set-top box indicating that remote control is now in the mode to operate that device. If the remote control is in an unprogrammed mode and the user operates the remote control, the remote control will emit only a code that is recognized by the set-top box indicating that remote control is an unprogrammed mode. The use and functions of these possible codes are described in more detail below.

The set-top box gives the user feedback regarding the programming of the universal remote control, via OSDs, as described herein. Through these OSDs the user is informed as to the programming and operation mode of the remote control and given the option to program the remote control in a certain manner if the remote control is not programmed to operate a device the user intends to operate. For example, if the remote control is unprogrammed for a particular device the user wishes to operate, the set-top box displays an OSD on the television, which offers to instruct the user on how to program the remote control. Then the user may select an on-screen button displayed in an OSD and access interface screens that instruct the user regarding the programming of the remote control. The notifications via the OSDs prevent confusion and inform a user, who has an unprogrammed remote control and/or inadvertently switched modes, as to why the remote control no longer seems to function. The subsequent programming of the remote control, as detailed herein, enables the user to solve this problem without having to log a call to a help desk or service center, which decreases the costs associated with operating such service centers for the satellite or cable signal provider.

In another example, if the user switches a remote control to a mode that is programmed, the set-top box causes an OSD to be displayed that indicates to the user that the user us now operating the remote control 206 in a certain, programmed mode.

The example methods, apparatus and articles of manufacture described herein are described in operation with a satellite broadcast system. However, such example is not restrictive. The example methods, apparatus and articles of manufacture described herein may be used with any universal remote control and equipment the remote control operates or is intended to operate, regardless of how the system in which the remote control is used is configured or what the system is. As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136.

In further detail, the example transmission station 102 of the example system of FIG. 1 includes a plurality of sources of data and/or information (e.g., program sources 108, a control data source 110, a data service source 112, and one or more program guide data sources 114). During operation, information from one or more of these sources 108-114 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a person (i.e., a user), wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. As described in detail below, the receiver station 106 gathers the SCIDs related to the game, wherein the program guide data source 114 has previously provided to the receiver station 106 a list of SCIDs that correspond to the game.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to a receiver 130. As described in conjunction with FIGS. 2 and 3 below, the receiver 130 may be a set-top box or may be a personal computer (PC) having a receiver card installed therein. A display device 132, such as, for example, a television set or a computer monitor, is coupled to the receiver 130 for displaying received programming to a user. Additionally, the example receiver station 106 may include a recorder 134 used to record programming received by the receiver station 106. The recorder 134 may be, for example, a device capable of recording information on media, such as videotape or digital media such as a hard disk drive, a DVD, a compact disk (CD) and/or any other suitable media.

Although not necessary for proper operation of the example system of FIG. 1, the receiver station 106 may optionally incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite 104. The signals are coupled from the reception antenna 126 to the LNB 128, which amplifies and, optionally, downconverts the received signals. The LNB output is then provided to the receiver 130, which, as described in detail below, receives, depacketizes, demultiplexes and decodes the received signal to provide audio and video signals to the display device 132 and/or the recorder 134. The receiver 130 is responsive to user inputs to tune to a particular program, by selecting and decoding a particular frequency and the particular SCIDs on which the desired program is located.

Figure 2:
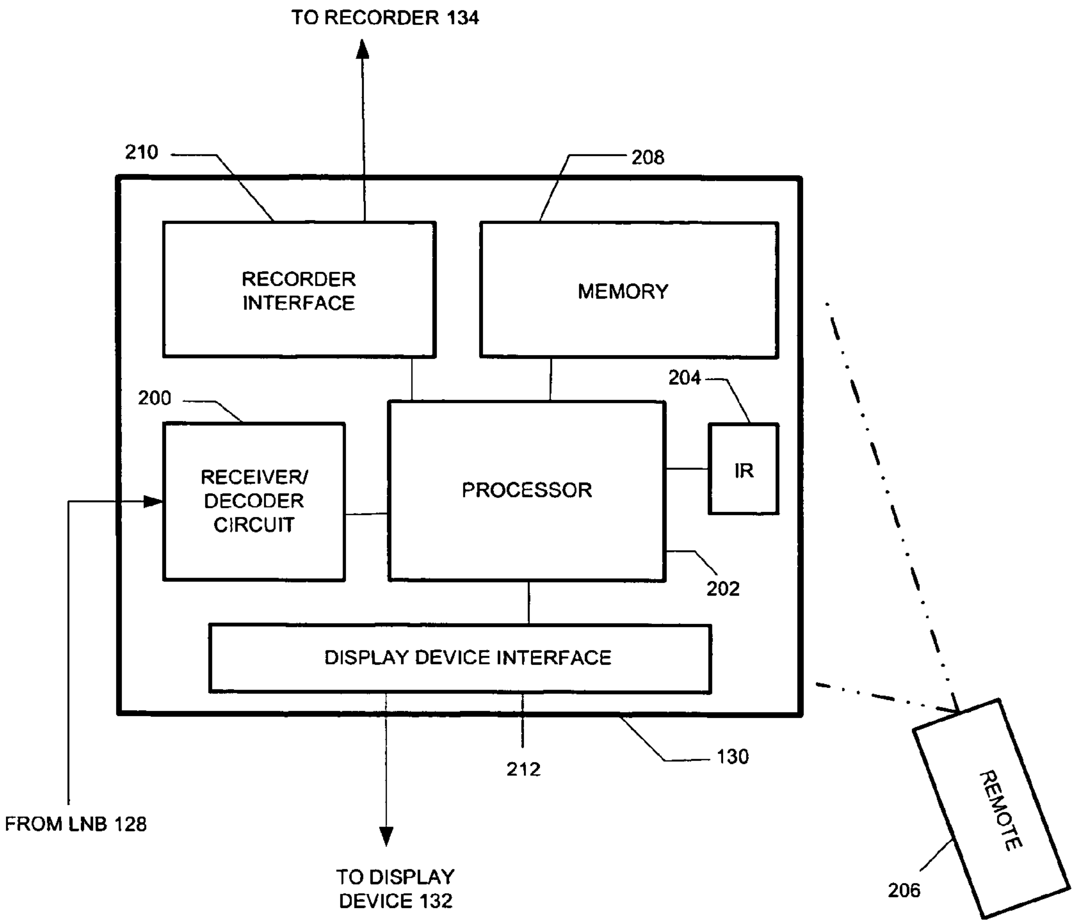
FIG. 2 is a schematic illustration of a portion of the example satellite broadcast system of FIG. 1.

FIG. 2 depicts the receiver 130 of FIG. 1 in more detail. Specifically, the receiver 130 includes front-end circuitry 200 in the form of a receiver/decoder circuit, a processor 202, an entry device 204, a memory 208, a recorder interface 210, and a display device interface 212. Further, the receiver 130 may be operated remotely by a remote control 206.

In general, the front-end circuitry 200 inside the receiver 130 receives the L-band Radio Frequency (RF) signals from the LNB 128 and converts the signals back into the original digital data stream. The decoding circuitry 200, receives the original data stream and performs video/audio processing operations such as demultiplexing and decompression. The processor, microprocessor or central processing unit (CPU) 202 controls the overall operation of the receiver 130, including the selection of parameters, the set-up and control of components, channel selection, and many other functions.

The entry device 204 is the port for communication between the receiver, or set-top box, 130 and the remote control 206. The entry device 204 may be, for example, an IR and/or RF detector adapted to receive communications from the remote control 206. The entry device 204 senses the operation of the remote control device 206 and relays the signals from the remote control 206 to the processor 202.

The memory 208 that is connected to the processor 202 is used to store information such as, for example, instructions for operation of the processor 202 to perform the processes described herein, tables of programmed special codes for use in the processes, and other proprietary software designed to recognize codes associated with the remote control modes. The type, size and proportion of the memory illustrated in the example receiver 130 may vary.

The example receiver 130 also includes a plurality of interfaces such as, for example the recorder interface 210 and the display device interface 212. The interfaces 210, 212 may be used to provide connectivity to one or more peripherals, for example a recorder 134 or a display device 132.

Although the example receiver 130 is shown as having a plurality of components that are interconnected or communicatively coupled with other components, such interconnections are illustrated by way of example and should not be construed as limiting the manner in which the components can be interconnected to the example methods, apparatus, and/or systems described herein. On the contrary, the devices described above in connection with the receiver 130 may be interconnected in any other suitable manner to implement the example methods, apparatus, and/or systems.

Figure 3:
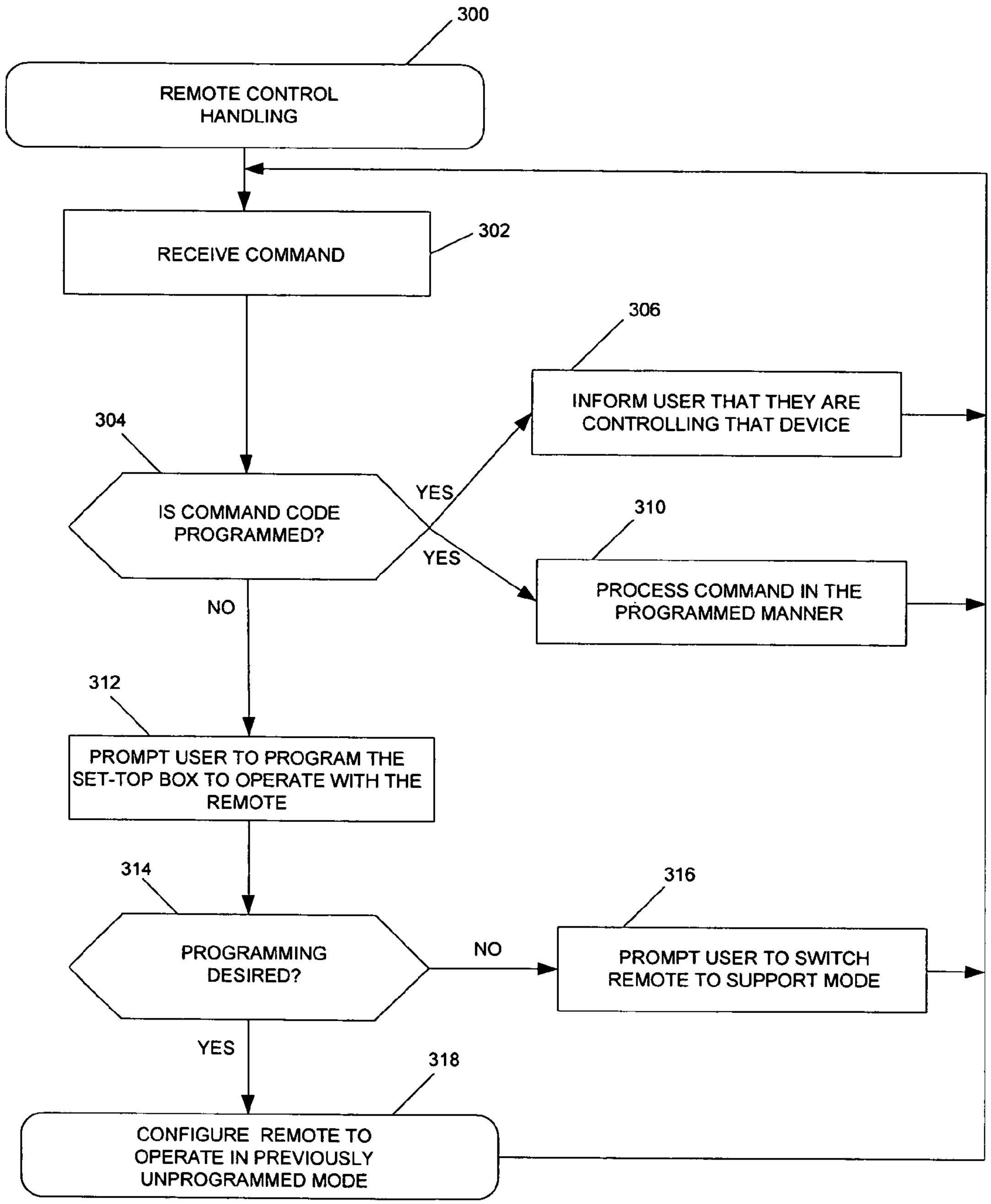
FIG. 3 depicts a flow diagram representation of an example remote control mode on-screen display notification process.

FIG. 3 depicts a flow diagram representative of an example remote-control-handling process 300. The process 300 may be, for example, implemented using hardware, software, or firmware executed by the processor 202 or any suitable combination thereof. For instance, the receiver 130 of FIGS. 1 and 2 may execute the machine readable instructions to implement the operations described below. For example, the process 300 of FIG. 3 may be embodied in coded instructions stored on a tangible medium such as a flash memory, or RAM associated with the processor 202 and/or the memory 208. Alternatively, some or all of the operations of the process 300 may be implemented using an application specific integrated circuit (ASIC), a programmable logic device (PLD), a field programmable logic device (FPLD), discrete logic, hardware, etc. Additionally, some or all of the example machine readable instructions 300 of FIG. 3 may be implemented using software, firmware, hardware, and/or a combination of hardware and software and/or firmware. Also, some or all of the machine readable instructions 300 of FIG. 3 may be implemented manually or as combinations of any of the techniques described herein. Further, although the example machine readable instructions 300 of FIG. 3 are described with reference to the flowchart 300 of FIG. 3, persons of ordinary skill in the art will readily appreciate that many other methods of implementing the example remote control handling process 300 may be employed. For example, the order of execution of the blocks may be changed, and/or some of the blocks described may be changed, eliminated, sub-divided, or combined.

When a user activates the remote control 206, the remote control 206 emits signals that are received by the entry device 204. When the signals emitted by the remote control 206 are infrared (IR) signals, the entry device 204 is an infrared receiver. Other types of data entry devices may be used such as, for example, an RF receiver for sensing RF signals, a remote keyboard, a remote mouse, a keypad on the receiver 130, etc. The entry device 204 relays a signal to the processor 202 and the remote-control-handling process 300 begins with the indication that the command has been received (block 302). Once a command is received, the processor 202 determines the codes in the command. The processor reads the codes to determine if the codes are for a mode for which the remote control 206 has been programmed (block 304). In particular, the remote control 206 sends a code of "operation for programmed device" and "now in X mode" (for the programmed device), the remote control 206 or sends a "not programmed" code.

If the detected code has been programmed (block 304), the processor 202 instructs the display device interface 212 to present an OSD to the user at the display device 132. Alternatively, the OSD may be presented to the user on the remote control 206 or at the set-top box 130, if such display is supported. An example OSD may read "The remote is in AV1 mode" (block 306) if the remote is in AV1 mode and the remote has been programmed to operate device programmed at or connected to AV1. This indicates to the user that the user is operating the device programmed at or connected to AV1. Either simultaneously or sequentially, the remote control 206 emits codes for the intended piece of equipment, e.g., the display device 132, or the intended piece of equipment senses the code emitted from the remote control 206 via an entry port of the intended piece of equipment (not shown). Then, the intended piece of equipment operates according to the instructions (block 310) because the remote control 206 has been programmed to operate with the intended piece of equipment.

An example situation in which the remote-control-handling process 300 would run through blocks 302, 304, 306 and 310 is when a user activates a remote control 206 to operate a display device 132 such as, for example, a television. The receiver 130 receives indication that the user had actuated the remote control 206. The entry device 204 relays the signal from the remove control 206 and the remote-control-handling process 300 begins. The processor 202 receives a command from the entry device 204 (block 302). Next, the processor 202 determines if the code of the remote control signal indicates that the remote control 206 is "now in X mode" (i.e., that the remote control 206 has been programmed for that mode) or "not programmed." After determining that the code from the remote control 206 is for the television 132 and the user has already programmed the receiver 130 and remote control 206 to operate for the specific television 132 indicated, the processor 202 sends a signal to the display device interface 212 to display an OSD on the television 132 indicating that the user is operating the television (block 306). Meanwhile, because the remote control 206 has already been programmed to operate the television, the television processes the command (block 310) in the manner intended. No further notifications regarding the mode of the remote control 206 will appear on the display while the remote control 206 stays in any one mode. Notifications are only displayed the first time a remote control 206 is operated after a change of modes has occurred.

If the user attempts to operate the remote control 206 in a mode that is unprogrammed, the processor 202 will not simply remain idle because the mode is unrecognized. Rather, the remote control 206 emits an "unprogrammed mode" code, which the processor 202 recognizes and which indicates to the processor 202 that an attempt is being made to operate a device via the remote control 206 for which the remote control 206 has not yet been programmed to operate. In other words, an unprogrammed remote control 206 emits a special code that can be recognized by the set-top box 130. This "unprogrammed code" specifically identifies that the remote control 206 is attempting to operate a device for which the remote control 206 has not yet been programmed. If the processor 202 determines that the remote control 206 is in a mode that is not programmed, the processor 202 will instruct the display device 132 to present an OSD to the user (block 312). The OSD would prompt the user to program the remote control 206 to operate in the attempted mode. The OSD may appear on a display device 132, which may be, for example, a television, a set-top box, a screen on a remote control or any other device that may be used to display information.

The process for detecting unprogrammed remote control modes and displaying remote control mode status information and programming instructions may be written and installed by the set-top box manufacturer or the broadcast service provider. New set-top boxes may have this software preinstalled. Existing set-top boxes in the field may be updated with this process via downloads to the box.

Figure 4:
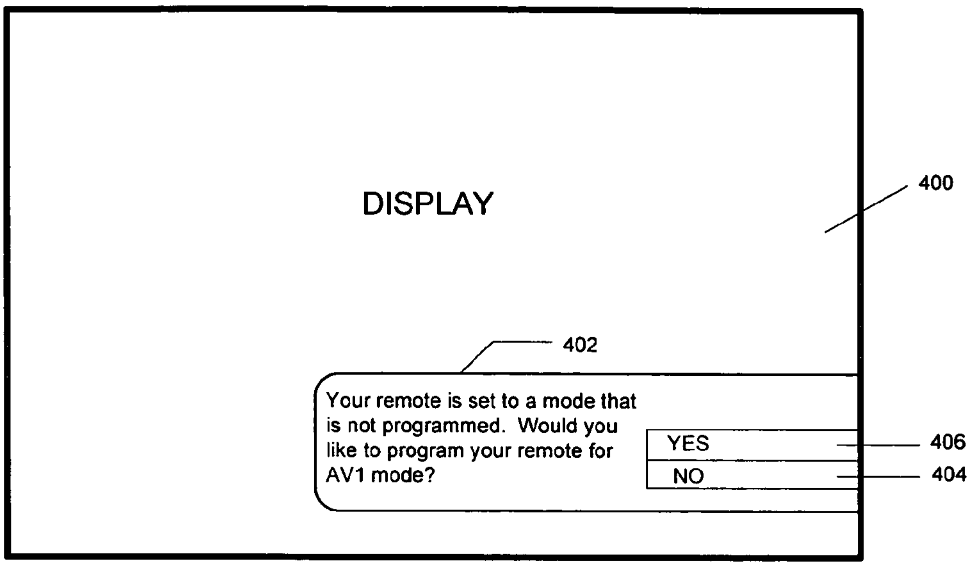
FIG. 4 depicts an example on-screen display message that may be used to notify a user of the mode of a remote control.

An example OSD associated with programming the remote control 206 (block 312) is shown in FIG. 4. The OSD 400 of FIG. 4 includes a message 402 that prompts the user to program the remote control 206. In the example OSD 400, the message 402 may read, "Your remote is set to a mode that is not programmed. Would you like to program your remote for AV1 mode?" Once prompted, the user then decides whether or not programming is desired (block 314) by selecting either the "NO" button 404 or the "YES" button 406 from the OSD 400. Please note that AV1 mode may be any mode such as, for example, AV2, TV or any other mode for any other device connected to the system.

Figure 5:
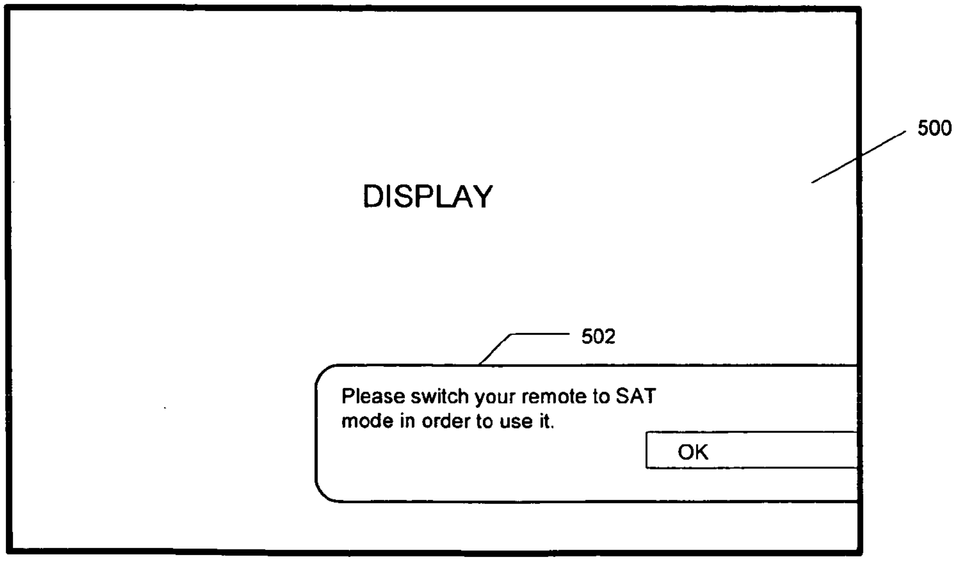
FIG. 5 depicts an example on-screen display message that indicates to what mode the user should switch a remote control.

If the user selects the "NO" button 404, the set-top box 130 prompts the user to switch the remote control 206 to a supported mode (block 316). In one example, the set-top box 130 does this by presenting another OSD 500 to the display device 132, as shown in FIG. 5. OSD 500 includes a message 502 that prompts the user to switch the mode of the remote control 206. In the example OSD 500, the message 502 may read, "Please switch your remote to SAT mode in order to use it." The message may instruct the user to switch to any of a variety of programmed modes to enable the user to use the remote control 206 to properly operate an intended device. After viewing the message 502, the user only has the option to select the "OK" button 504, which exits OSD 500. Note that in alternative examples, OSD 400 and OSD 500 may be combined into one OSD. The single OSD may read "Your remote is set to a mode that is not programmed. Please program your remote for AV1 mode, or switch the remote to SAT mode." The buttons on the single screen may be "Program Remote" and "Done."

After the user exits OSD 500 and attempts to use the remote control 206 again, the remote handling process 300 begins anew. If the user followed the directions in the message 502, the remote handling process executes blocks 302, 304, and 306. If the user did not switch the remote control 206 into SAT mode, i.e. a programmed mode, the remote-control-handling 300 process continues through until block 312 where OSD 400 is displayed again.

Figure 6:
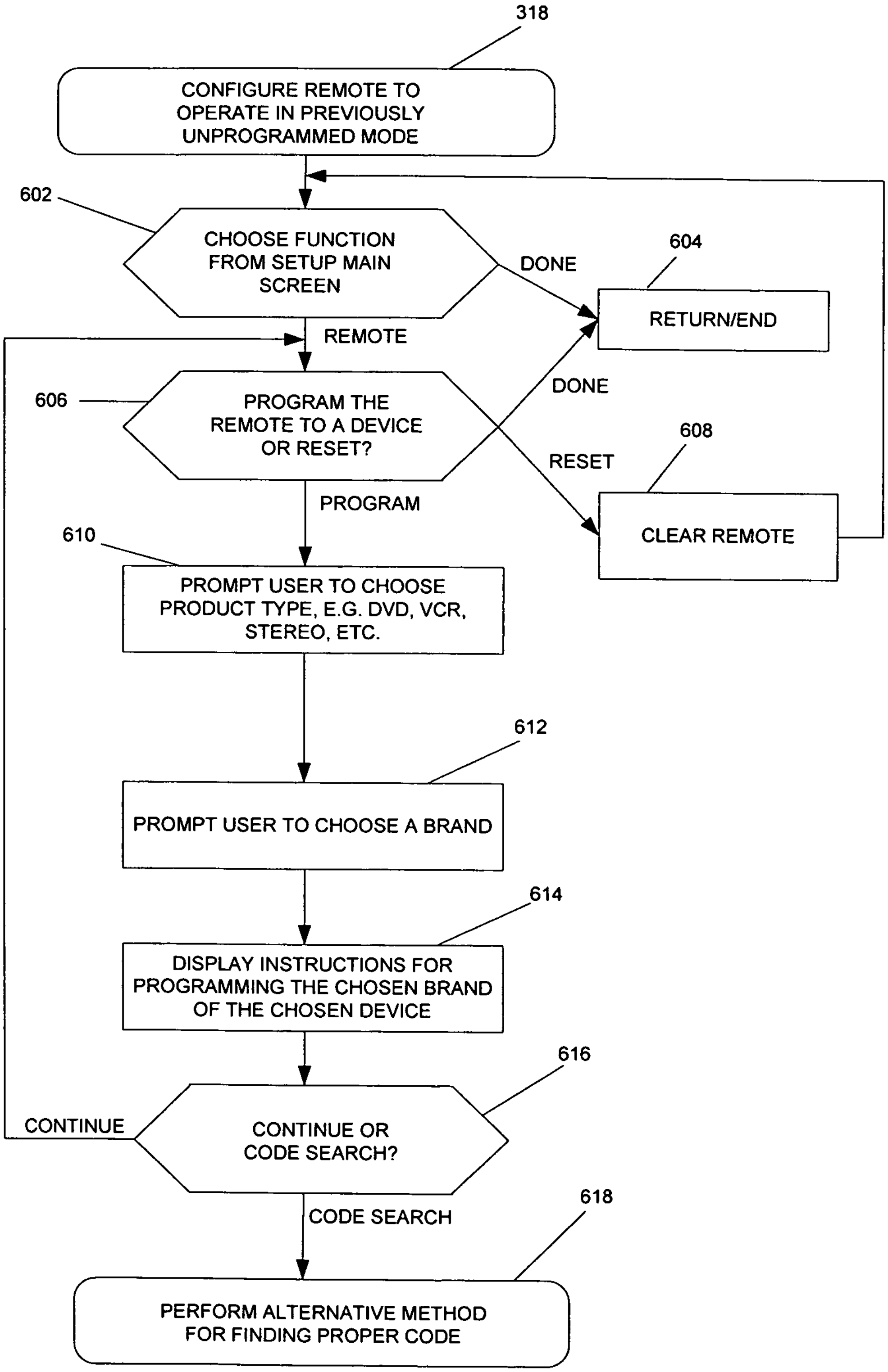
FIG. 6 depicts a flow diagram representation of an example remote control mode configuration process.

If the user selects the "YES" button 406 from OSD 400, a secondary process 318 begins. The secondary process 318 is performed to configure the remote control 206 to operate in a previously-unprogrammed mode. This process 318 is shown in greater detail in FIG. 6. Like the process 300 of FIG. 3, the process 318 may be, for example, implemented using hardware, software, or firmware executed by a processor or any suitable combination thereof. For instance, the receiver 130 of FIGS. 1 and 2 may execute the machine readable instructions to implement the operations described below. For example, the process 318 of FIG. 6 may be embodied in coded instruction stored on a tangible medium such as a flash memory, or RAM associated with the processor 202 and/or the memory 208. Alternatively, some or all of the operations of the process 318 may be implemented using an application specific integrated circuit (ASIC), a programmable logic device (PLD), a field programmable logic device (FPLD), discrete logic, hardware, etc. Additionally, some or all of the example machine readable instructions 318 of FIG. 6 may be implemented using software, firmware, hardware, and/or a combination of hardware and software and/or firmware. Also, some or all of the machine readable instructions 318 of FIG. 6 may be implemented manually or as combinations of any of the techniques described herein. Further, although the example machine readable instructions 318 of FIG. 6 are described with reference to the flowchart 318 of FIG. 6, persons of ordinary skill in the art will readily appreciate that many other methods of implementing the example remote control handling process 318 may be employed. For example, the order of execution of the blocks may be changed, and/or some of the blocks described may be changed, eliminated, sub-divided, or combined.

Figure 8:
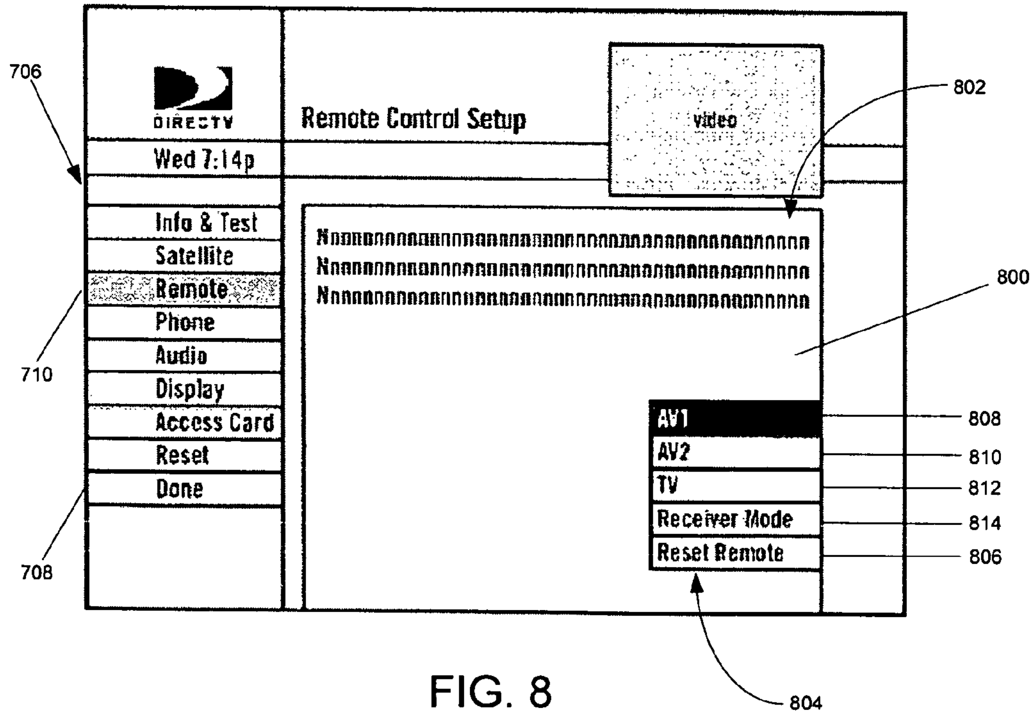
FIG. 8 depicts an example first remote control setup interface.

After the user selects to program the remote control 206, i.e., enter the configure-remote-to-operate-in-previously-unprogrammed-mode process 318, the processor routes the user to the Remote Control Setup screen 800 as shown in FIG. 8, which is discussed in more detail below.

Figure 7:
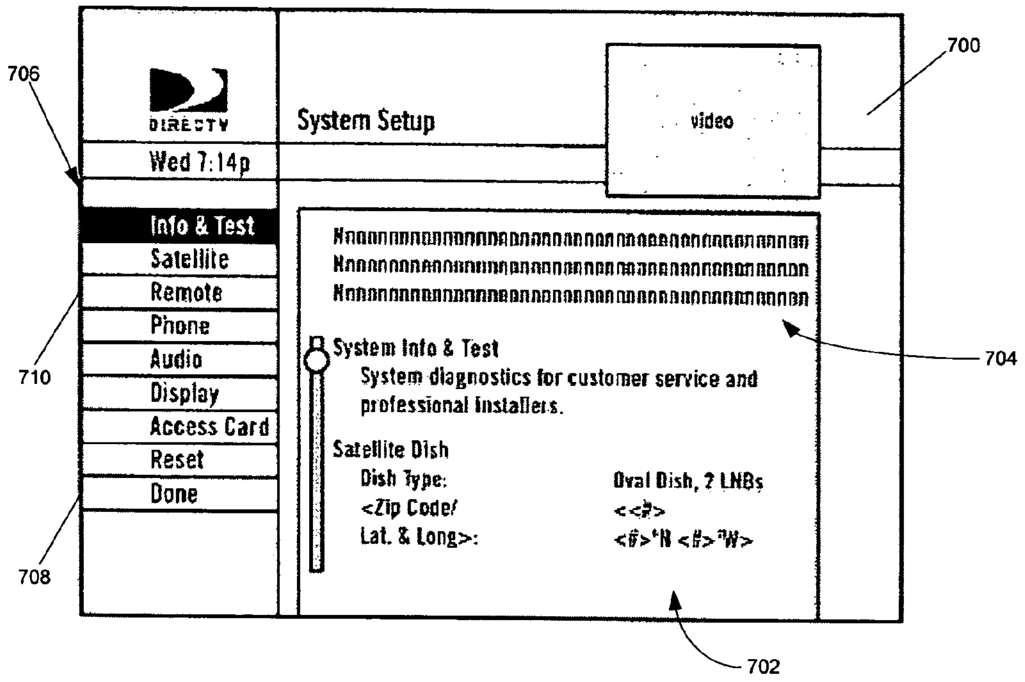
FIG. 7 depicts an example routing to an example system setup main interface.

Alternatively, the user may enter the System Setup screen 700 as shown in FIG. 7, without going through the OSD 400. In the System Setup screen 700, the bottom portion 702 of the System Setup screen 700 shows the system status of various associated settings in the set-top box 130. The top portion 704 of the System Setup screen 700 contains instructions and/or other useful information for the user (shown by the variables "Nnnnnn . . . "). While viewing the System Setup screen 700, the user selects a function from the panel 706 (block 602).

If the user chooses the "Done" tab or menu item 708 from the System Setup screen 700, the process 318 is brought to an end (block 604). The System Setup screen 700 is then withdrawn from the display device 132.

If the user chooses the "Remote" menu item 710, the System Setup screen 700 changes to the Remote Control Setup screen 800, as shown in FIG. 8. Alternatively, as mentioned above, and preferably, once the user selects the "YES" button 406 from OSD 400, the user is brought directly to the Remote Control Setup screen 800. The top portion 802 of the screen 800 includes instructions and/or other information for the user. Toward the bottom of the screen 800, a series of tabs or buttons 804 appears, which the user can use to program the remote control 206 or choose to reset the remote control 206 (block 606). If the user selects the "Reset Remote" button 806, the set-top box 130 displays instructions telling the user how to reset the remote control 206. Once the user follows the instructions, the remote control 206 is cleared (block 608). The Remote Control Setup screen 800 is then withdrawn from the display device 132.

Similar to the options in the System Setup screen 700, if the user chooses the "Done" menu item 708 from the Remote Control Setup screen 800, the process 318 is brought to an end (block 604). The Remote Control Setup screen 800 is then withdrawn from the display device 132.

Figure 9:
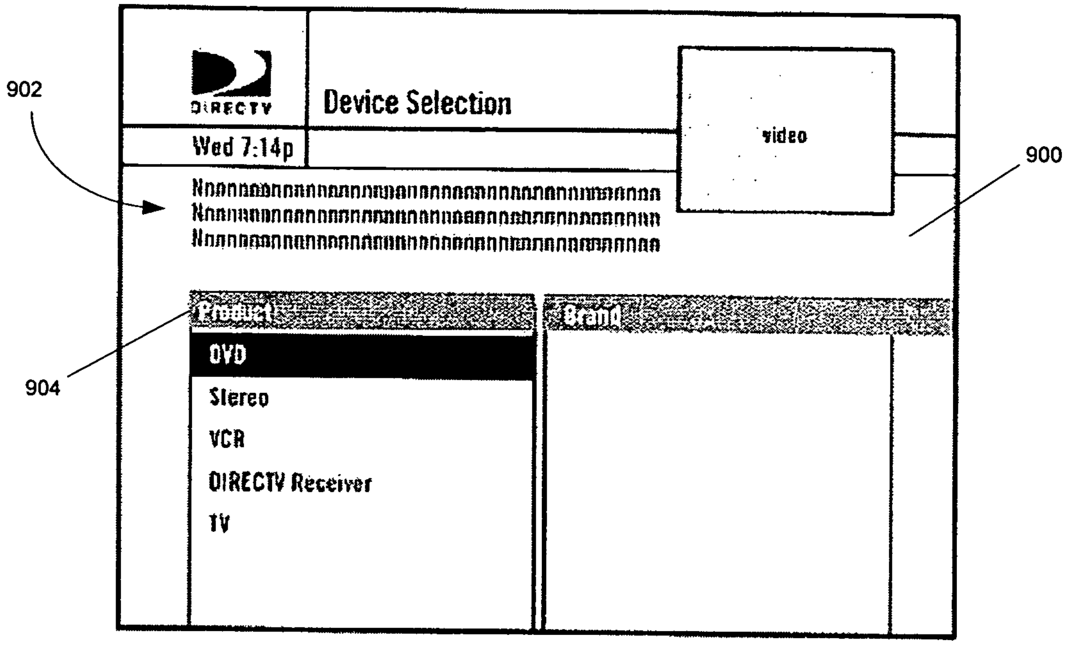
FIG. 9 depicts another example remote control setup interface.
Figure 10:
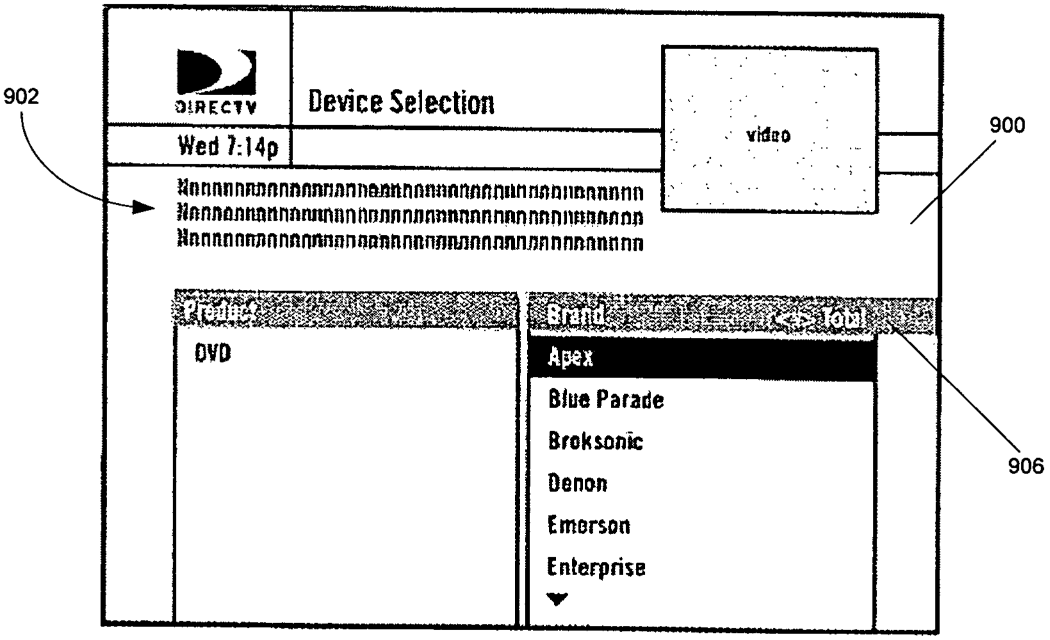
FIG. 10 depicts a third example remote control setup interface.

Alternatively, the user may select the "AV1" button 808, "AV2" button 810, "TV" button 812 or any other button that may appear on the screen 800 to program the remote control 206. Upon selection of the "AV1" button 808, "AV2" button 810, "TV" button 812, etc., the user is next prompted to choose the type of product the user desires to program (block 610). A Device Selection screen 900 appears as a visual depiction of block 610 (See FIGS. 9 and 10). The Device Selection screen 900 includes instructions and/or other information 902 for the user that prompt the selection of the type of product (block 610), as shown on the left side of the screen in the Product box 904. After selecting a type of product (e.g., a DVD player, a stereo, a VCR, a receiver, or a TV, etc.), the user is then prompted to select a brand (block 612). The prompt for brand selection (block 612) also appears in Device Selection screen 900 in the Brand box 906 on the right. Note that the instructions 902 may change within a screen. For example, the instructions 902 of FIG. 9 may differ from the instructions 902 of FIG. 10. After the user selects the brand, the processor 202 has enough information to display instructions 1102 (FIG. 11) for programming the chosen brand of the chosen device (block 614).

Figure 11:
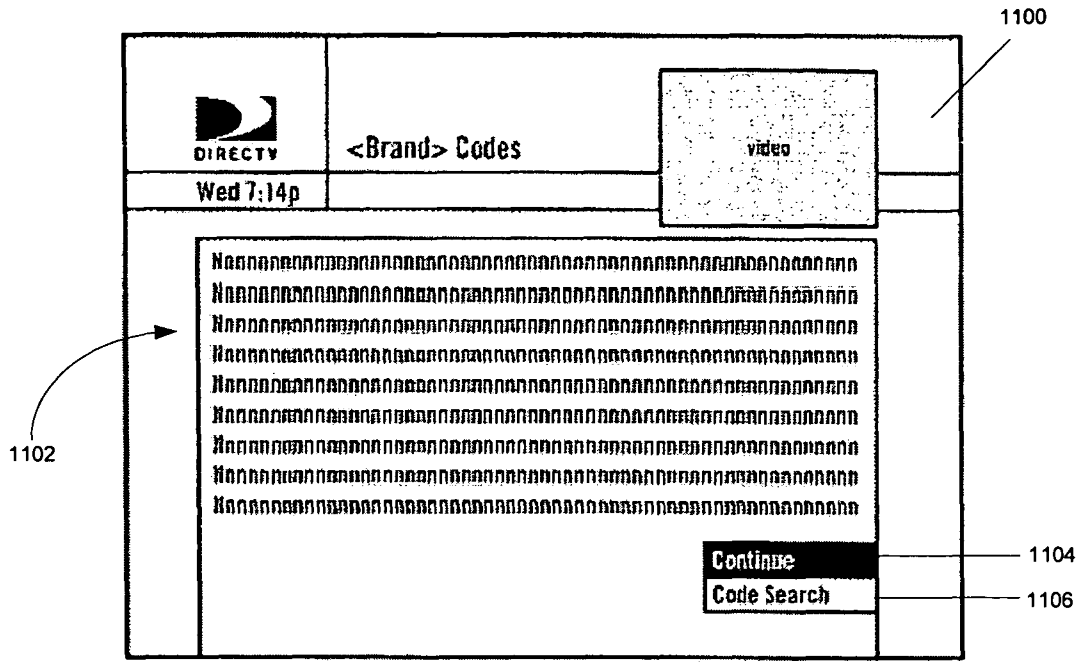
FIG. 11 depicts a fourth example remote control setup interface.

The instructions 1102 are displayed in a Brand Codes screen 1100, as shown in FIG. 11. The instructions 1102 tell the user how to program the code for the desired mode of the remote control 206 to enable future recognition of the code by the processor 202 so the remote control 206 will operate the intended device. Upon completion of the instructions 1102, the user may select the "Continue" button 1104 (block 616), at which point the Brand Codes screen 1100 is replaced with the Remote Control Setup screen 800. Here, the user can select to reenter the configure-remote-to-operate-a-previously-unprogrammed-mode process 318 by selecting the "AV1" button 808, "AV2" button 810 or "TV" button 812, or the user may choose to exit the set-up by selecting the "Done" menu item 708. Also, the user may enter any other area of system set-up by choosing any of the menu items in the panel 706.

As an alternative to completing the instructions 1102 displayed in a Brand Codes screen 1100, the user may select the "Code Search" button 1106 (block 616). Selecting the "Code Search" button 1106 brings the user into another process 618 which performs an alternative method for finding the proper code for the remote control 206 mode.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for notifying a user of a remote control regarding the mode of a remote control, the method comprising:

detecting a first code from the remote control, wherein the first code is an operation mode code and relates to the operation of a first device of a plurality of devices, wherein the first code is detected when the remote control has been programmed to operate and is in a mode to operate the first device;

comparing the detected first code to a list of recognized operation mode codes related to the operation of the plurality of devices to identify the first device;

detecting a second code from the remote control, wherein the second code indicates that the remote control is in an unprogrammed mode, wherein the second code is detected when the remote control is not in a mode to operate any of the plurality of devices; and informing the user of at least one of: the identity of the first device the remote control is operating based on the detected first code, or that the remote control is not programmed to operate any of the plurality of devices based on the detected second code.

2. A method as defined in claim 1, wherein informing the user occurs via an on-screen display.

3. A method as defined in claim 2, wherein the on-screen display is presented on at least one of: a television screen, the remote control, or a set-top box.

4. A method as defined in claim 1, further comprising:

offering to program the remote control according to a desired mode of the remote control.

5. A method as defined in claim 1, further comprising programming the remote control according the desired mode of the remote control.

6. A method as defined in claim 5, wherein the programming utilizes interface screens.

7. A method as defined in claim 1, further comprising indicating to the user to change the mode of the remote control.

8. A method as defined in claim 1, further comprising detecting a first command code for the first device from the remote control and processing a first command associated with the command code substantially simultaneously as informing the user of the identity of the first device.

9. A method as defined in claim 8, further comprising detecting a second command code for the first device and processing a second command associated with the second command code without informing the user of the identity of the first device.

10. A method as defined in claim 8, further comprising:

detecting a second command code for a second device;

processing a second command associated with the second command code; and informing the user of an identity of the second device.

11. A method of programming a remote control, the method comprising:

emitting a code from the remote control after a button on the remote control has been pressed, wherein the code is unrelated to any function associated with the button and the code indicates that the remote control is not in a mode to operate a device;

detecting the code from the remote control;

informing the user that the remote control is in an unprogrammed mode;

offering instructions on how to program the remote control according to a desired mode of the remote control; and instructing the user to change the mode of the remote control if the user declines the instructions to program the remote control.

12. A method as defined in claim 11, wherein informing the user occurs via an on-screen display.

13. A method as defined in claim 12, wherein the on-screen display appears on at least one of: a television screen, the remote control, or a set-top box.

14. A machine accessible medium having machine readable instructions that, when executed, cause a machine to:

detect a first code from the remote control, wherein the first code is an operation mode code and relates to the operation of a first device of a plurality of devices, wherein the first code is detected when the remote control has been programmed to operate and is in a mode to operate the first device;

compare the detected first code to a list of recognized operation mode codes related to the operation of the plurality of devices to identify the first device;

detect a second code from the remote control, wherein the second code indicates that the remote control is in an unprogrammed mode, wherein the second code is detected when the remote control is not in a mode to operate any of the plurality of devices; and inform the user of at least one of: the identity of the first device or mode the remote control is operating based on the detected first code, or that the remote control is not programmed to operate any of the plurality devices based on the detected second code.

15. A machine accessible medium as defined in claim 14, wherein the machine informs the user via an on-screen display.

16. A machine accessible medium as defined in claim 15, wherein the on-screen display appears on one of: a television screen, the remote control, or a set-top box.

17. A machine accessible medium as defined in claim 14, further causing a machine to offer instructions on how to program the remote control according to a desired mode of the remote control.

18. A machine accessible medium as defined in claim 14, further causing a machine to indicate to the user to change the mode of the remote control.

19. A system comprising:

a remote control that emits a first code and a second code, wherein the first code is an operation mode code that indicates that the remote control is in a mode to operate a first device of a plurality of devices and the second code is an unprogrammed-mode code that indicates that the remote control is not in a mode to operate any of the plurality of devices;

a set-top box;

a memory storing a first data structure including a plurality of data records, each of the plurality of data records storing operation mode codes related to the operation by the remote control of each of the plurality of devices that the remote control has been programmed to operate; and software for notifying a user that the remote control is in a mode to operate the first device if the first code is detected and is programmed into the memory and that the remote control is in an unprogrammed mode if the second code is detected.

20. A system as defined in claim 19, further comprising an on-screen display for informing the user.

21. A system as defined in claim 20, wherein the on-screen display appears on one of: a television screen, the remote control, or a set-top box.

22. A system as defined in claim 19, further comprising software that includes the step of programming the remote control according to a desired mode of the remote control.

23. A system as defined in claim 19, further comprising an indicator indicating to the user to change the mode of the remote control.

* * * * *